3,775,452
PLATINUM COMPLEXES OF UNSATURATED SILOXANES AND PLATINUM CONTAINING ORGANOPOLYSILOXANES

Bruce D. Karstedt, Scotia, N.Y., assignor to General Electric Company
No Drawing. Continuation of application Ser. No. 861,199, Sept. 25, 1969, which is a continuation of application Ser. No. 598,216, Dec. 1, 1966, both now abandoned. This application Apr. 28, 1971, Ser. No. 138,273
Int. Cl. C07f 15/00; C08g 31/02
U.S. Cl. 260—429 R    7 Claims

ABSTRACT OF THE DISCLOSURE

Platinum complexes of unsaturated siloxanes are provided which are useful as hydrosilation catalysts. These platinum-siloxane complexes can contain an average of up to about one halogen atom, per gram atom of platinum, which include platinum-siloxane complexes which are substantially free of inorganic halogen. These platinum-siloxane complexes can be made by effecting contact between a platinum halide and an unsaturated siloxane, for example 1,3-divinyltetramethyldisiloxane, and removing available inorganic halogen from the resulting material. In addition, curable organopolysiloxane compositions are provided comprising an organo-polysiloxane polymer and an effective amount of such platinum-siloxane complex.

---

This application is a continuation of application Ser. No. 861,199, filed Sept. 25, 1969, which in turn is a continuation of application Ser. No. 598,216, filed Dec. 1, 1966, both now abandoned.

The present invention relates to platinum-siloxane complexes of unsaturated siloxanes which are useful as hydrosilation catalysts, and to curable organopolysiloxane compositions containing such catalysts. In addition, the present invention relates to methods for making these materials.

Prior to the present invention, various hydrosilation methods were known for effecting the addition of an organosilicon material, having a hydrogen atom attached to silicon, to an aliphatically unsaturated material having either olefinic or acetylenic unsaturated resulting in the formation of an adduct having a new silicon-carbon linkage. The reaction is illustrated with respect to the olefinic double bond as follows:

Many of the known hydrosilation methods involve the employment of a platinum catalyst in the form of a halogenated platinum compound, or finely divided platinum metal. For example, Speier Pat. 2,823,218 utilized chloroplatinic acid as the platinum catalyst. Another method is Bailey Pat. 2,970,150 which shows the employment of platinum metal supported on a finely divided carrier, such as charcoal. Additional methods are shown by Ashby Pats. 3,159,601 and 3,159,662, and Lamoreaux Pat. 3,220,972, all of which are assigned to the same assignee as the present invention.

Although the above-described platinum catalyzed hydrosilation methods provide for valuable results, the parts by weight of platinum metal values, per million parts of hydrosilation mixture, required for effective results, often render these methods economically unattractive. In many instances, for example, substantial amounts of platinum metal values are rendered catalytically inactive and beyond recovery. The loss of platinum values can be aggravated by the fact that the use of excessively high parts by weight of platinum catalyst are sometimes required to achieve desirable hydrosilation rates. However, it has been found in particular instances that the rate of hydrosilation is sometimes diminished when some of the prior art platinum catalysts are utilized above normal catalyst weight proportions.

Prior to the present invention therefore, platinum catalyzed hydrosilation methods often resulted in the loss of undesirable amounts of platinum metal values. In addition, the limited cure rate provided by the employment of prior art platinum catalyst has often limited the extension of hydrosilation as a cure mechanism in organo-polysiloxane compositions.

The present invention is based on my discovery that significantly improved hydrosilation results can be achieved with certain platinum-siloxane complexes, as defined hereinafter. These platinum-siloxane complexes have available inorganic halogen sufficient to provide for an average ratio of gram atoms of halogen, per gram atom of platinum, having a vlue of up to aboue one. As known by those skilled in the art, conventional platinum halides employed as hydrosilation catalysts have available inorganic halide sufficient to provide for an average ratio of gram atoms of halogen, per gram atoms of platinum having a value of at least about two.

Although I do not wish to be bound by theory, I have found that in order to produce the platinum-siloxane complexes of the present invention, there must be utilized (A) platinum halide, and (B) a complexing material in the form of an unsaturated organosilicon material selected from, (a) unsaturated silanes of the formula, (1)   $R_aR'_bSiX_{4-a-b}$ and (b) unsaturated siloxanes of the formula, (2)   $R_cR'_dSiO_{\frac{(4-c-d)}{2}}$ where R is free of aliphatic unsaturation and selected from monovalent hydrocarbon radicals, and halogenated monovalent hydrocarbon radicals, and R' is selected from monovalent aliphatically unsaturated hydrocarbon radicals and halogenated monovalent aliphatically unsaturated hydrocarbon radicals, X is a hydrolyzable radical, $a$ is a whole number having a value between 0 to 2, inclusive, $b$ is a whole number having a value between 1 to 4, inclusive, the sum of $a$ and $b$ is equal to 1 to 4, inclusive, $c$ has a value equal to 0 to 2, inclusive, $d$ has a value equal to 0.0002 to 3, inclusive and the sum of $c$ and $d$ is equal to 1 to 3, inclusive.

The platinum-siloxane complexes of the present invention can be made (1), effecting contact between an unsaturated organosilicon material as defined by Formula 1 or 2 above, and a platinum halide, to provide for the production of a mixture having a concentration of available inorganic halogen, which is sufficient to provide for an average ratio of gram atoms of halogen, per gram atom of platinum having a value of at least about two, (2) treating the resulting mixture of (1), to effect the removal of available inorganic halogen, and (3) recovering from (2), a platinum-siloxane complex having available inorganic halogen which is sufficient to provide for an average ratio of gram atoms of halogen, per gram atom of platinum, having a value up to about one.

As used throughout the description of the present invention, the term "available inorganic halogen," will designate halogen that can be detected by a modification of ASTM designation D-1821-63 for "Inorganic Chloride." The procedure employed is substantially as described, except there is utilized in place of acetone, which is the solvent specified in the test, a mixture of glacial acetic acid and acetone. The procedure employed for determining gram atoms of platinum in the platinum-siloxane complexes was Atomic Absorption Spectroscopy. For example the method of R. Dockyer and G. E. Hames, Analyst, 84, 385 (1959).

Preferably, the platinum-siloxane complexes of the present invention consist essentially of chemically combined platinum and organosiloxane of the formula, (3) $$R_eR'_fR''_gSiO_{\frac{(4-e-f-g)}{2}}$$

which organosiloxane consists essentially of chemically combined siloxy units selected from (c) $$R''_hSiO_{\frac{(4-h)}{2}}, \text{ and}$$

(d) mixtures of (c) and $$R'''_jSiO_{\frac{(4-j)}{2}}$$

where R and R' are as defined above, R'' is selected from R' radicals chemically combined with platinum, and R''' is selected from R radicals and R' radicals, $e$ has a value equal to 0 to 2, inclusive, $f$ has a value equal to 0 to 2, inclusive, and $g$ has a value equal to 0.0002 to 3, inclusive, and the sum of $e$, $f$ and $g$ has a value equal to 1 to 3, inclusive, $h$ is an integer equal to 1 to 3, inclusive, and $j$ is a whole number equal to 0 to 3, inclusive.

The above-described platinum-siloxane complexes of platinum and organosiloxanes of Formula 3, can be made in accordance with the practice of the invention, as previously described, utilizing a platinum halide, and either an unsaturated silane of Formula 1, or an unsaturated siloxane of the formula, (4) $$R_kR'_mSiO_{\frac{4-k-m}{2}}$$

having at least one structural unit of the formula, $$\equiv\!SiOSi\!\equiv\phantom{R'}\overset{R'\ \ R'}{\underset{|\ \ \ \ |}{}}$$

where the unsatisfied valences of the above structural unit can be satisfied by R, R' and oxygen radicals, where R and R' are as previously defined, $k$ has a value equal to 0 to 2, inclusive, $m$ has a value equal to 0.0002 to 3, inclusive, and the sum of $k$ and $m$ has a value equal to 1 to 3, inclusive.

Radicals included by R, are for example, alkyl radicals such as methyl, ethyl, propyl, butyl, pentyl, hexyl, heptyl, octyl, etc.; cycloalkyl radicals such as cyclohexyl, cycloheptyl, etc.; aryl radicals such as phenyl, methyl, tolyl, xylyl, etc. radicals; aralkyl radicals such as benzyl, phenylethyl, phenylpropyl, etc. radicals; halogenated radicals of the aforementioned types including chloromethyl, chloropropyl, chlorophenyl, dibromophenyl, etc. radicals. Radicals included by R' are for example, aliphatically unsaturated radicals such as ethynl, 1-propynyl, etc.; vinyl, allyl, and cycloalkenyl radicals, such as cyclopentyl, cyclohexenyl, cycloheptenyl, cyclooctenyl, etc. and halogenated derivatives thereof. Radicals included by R'' are all of the aforementioned R' radicals, which are complexed with platinum; radicals included by R''' are all of the aforementioned R' radicals and R'' radicals. In the above formulae where R, R', R'' and R''' can represent more than one radical, these radicals can be all the same or any two or more of the aforementioned radicals respectively.

Unsaturated silanes included by Formula 1 are for example, tetra-vinylsilane, tri-allylmethylsilane, divinyldimethylsilane, tri-vinylphenylsilane, divinylmethylphenylsilane, cyclohexenyldimethylchlorosilane, divinylmethylchlorosilane, tri-vinylchlorosilane, divinylmethylethoxysilane, divinylmethylacetoxysilane, etc.

Included by the unsaturated siloxanes of Formula 2, are for example, disiloxanes of the formula, (5) $$R_aR'_hSiOSiR'_hR_a$$

where R, R', $a$ and $h$ are as defined above, and the sum of $a$ and $h$ per silicon atom is equal to 3. For example, there are included by disiloxanes of Formula 5 sym-divinyltetramethyldisiloxane, 1,1,divinyl, tetramethyldisiloxane, hexavinyldisiloxane, 1,1,divinyl, tetramethyldisiloxane, hexavinyldisiloxane, sym-divinyltetraphenyldisiloxane, 1,1, 3-trivinyl, trimethyldisiloxane, sym-tetravinyldimethyldisiloxane, etc.

There are also included by the unsaturated siloxanes of Formula 2, cyclopolysiloxanes including chemically combined units of the formula, $$\left[\underset{\underset{Y}{|}}{\overset{\overset{R'}{|}}{-SiOSi-}}\underset{\underset{Y}{|}}{\overset{\overset{R'}{|}}{}}\right]_x \left[\underset{\underset{Y}{|}}{\overset{\overset{Y}{|}}{-SiO-}}\right]_z$$

where R' is defined above, Y is selected from R and R' radicals, $x$ is an integer equal to 1 to 9, inclusive, $z$ is a whole number equal to 0 to 17, inclusive, and the sum of $x$ and $z$ is equal to 2 to 17, inclusive. For example, there is included 1,3,5-trivinyl, 1,3,5-trimethylcyclotrisiloxane, 1,3,5,7-tetra allyl, 1,3,5,7-tetraphenylcyclotetrasiloxane 1,3-divinyl, octamethylcyclopentasiloxane, etc.

The platinum halides which can be employed in the practice of the invention are for example, $H_2PtCl_6 \cdot nH_2O$ and metal salts such as $NaHPtCl_6 \cdot nH_2O$, $KHPtCl_6 \cdot nH_2O$, $NaPtCl_6 \cdot nH_2O$, $K_2PtCl_6 \cdot nH_2O$.

Also $PtCl_4 \cdot nH_2O$, and platinous type halides such as $PtCl_2$, $Na_2PtCl_4 \cdot nH_2O$, $H_2PtCl_4 \cdot nH_2O$, $NaHPtCl_4 \cdot nH_2O$, $KHPtCl_4 \cdot nH_2O$, $K_2PtBr_4$.

In addition platinum halide complexes with aliphatic hydrocarbon as taught in Ashby Patents 3,159,601 and 3,159,662, for example $[(CH_2=CH_2) \cdot PtCl_2]_2$;

$$(PtCl_2 \cdot C_3H_6)_2$$

etc. Other platinum halides which can be utilized are shown by Lamoreaux Patent 3,220,972, such as the reaction product of chloroplatinic acid hexahydrate and octyl alcohol, etc.

In addition to the above-described platinum-siloxane complexes, there is also included in the present invention, curable organopolysiloxane compositions having at least 0.01 part, and preferably 1 to 200 parts of platinum, per million parts of organopolysiloxane, comprising (C) organopolysiloxane of the formula, (6) $$R^{iv}_cR'_tSiO_{\frac{(4-c-t)}{2}}$$

and (D) platinum-siloxane complex as previously defined, and preferably such platinum-siloxane complex consisting essentially of chemically combined platinum and organosiloxane of the formula, $$R_nR'_pR''_qSiO_{\frac{(4-n-p-q)}{2}}$$

which organosiloxane is included within the scope of Formula 3, consisting essentially of from 2 to 500 chemically combined units selected from (e) $$R''_hSiO_{\frac{(4-h)}{2}}, \text{ and}$$

(f) mixtures of) (e) and $R'''_jSiO_{\frac{(4-j)}{2}}$ where R, R', R'', $c$, $e$, $f$, $g$, $h$, and $j$ are as defined above, $R^{iv}$ is selected from R radicals and cyanoalkyl radicals, $n$ has a value equal to 0 to 2, inclusive, $p$ has a value equal to 0 to 2, inclusive, $q$ has a value equal to 0.004 to 2, inclusive, the sum of $n$, $p$, and $q$ is equal to 1 to 3, inclusive, and $t$ is equal to 0.001 to 1, inclusive.

The significant difference of how my platinum-siloxane complexes differ from platinum halides of the prior art, is that there is less detectable inorganic halogen present in the platinum-siloxane complex of the present invention. Although I do not wish to be bound by theory, experimental evidence indicates that the platinum is chemically combined to the unsaturated siloxane by at least three ≡SiR'' units, per gram atom of platinum, where R'' is as previously defined. In any event, unlike platinum halides of the prior art, the platinum-siloxane complexes of the present invention can be entirely free of available inorganic halogen, or detectable inorganic halogen. In instances where available inorganic halogen is detected in the platinum-siloxane complexes of the present invention, the amount of such available inorganic halogen which can be detected should not exceed that quantity which is sufficient to provide for an average ratio of gram atoms of halogen, per gram atom of platinum having a value greater than one. Otherwise the activity of the resulting platinum-siloxane complex has been found to be adversely affected. The platinum-siloxane complexes of the present invention are stable for extended periods of time such as six months or more at temperatures between −50° C. to 50° C. In some instances, it is preferred to protect the platinum-siloxane complexes from atmospheric moisture.

The platinum containing organopolysiloxane compositions comprising organopolysiloxane polymer of Formula 6, and the platinum-siloxane complex of the present invention, can be cured to the solid state by the use of a variety of silicon hydrides as shown in my copending application Ser. No. 598,148, filed Dec. 1, 1966, filed concurrently herewith and assigned to the same assignee as the present invention. Suitable silicon hydrides which can be employed are for example, organocyclopolysiloxanes containing at least two chemically combined RHSiO units, and organopolysiloxane polymers having chemically combined $(R^{iv})_aSi(H)_qO$ units, where $R^{iv}$ and $a$ are as previously defined, and $q$ is equal to 1 or 2.

The organopolysiloxane polymers of Formula 6 can include chemically combined units of the formula, $$(R^{iv})_jSiO_{\frac{(4-j)}{2}}; \; R'_sSiO_{\frac{(4-s)}{2}}$$

where $R^{iv}$ and $j$ are as previously defined, and $s$ is an integer equal to 1 to 3, inclusive. There are included by the organopolysiloxane of Formula 6 fluids, gums, and resins, depending upon the ratio of $R^{iv}$ radicals to silicon atoms. As a result, the platinum containing organopolysiloxane compositions of the present invention, which are curable upon contact with the above-described silicon hydrides can be used in a variety of useful applications. They can be employed as encapsulants for electronic components where the organopolysiloxane of Formula 6 can be an organopolysiloxane fluid having terminal diorganoalkenylsiloxy units, such as dimethylvinylsiloxy units, having a viscosity of at least 500 centipoises at 25° C. In addition, organopolysiloxane gums having a viscosity of at least 100,000 centipoises at 25° C. and chemically combined methylvinylsiloxy units, etc., can provide for elastomeric forming compositions, etc. In addition, the platinum containing organopolysiloxane of the present invention can contain from 10 to 300 parts of filler per 100 parts of organopolysiloxane. For example, silica filler, such as fume silica, non-reinforcing filler, such as carbon black, etc.

In the practice of the invention, the platinumsiloxane complexes can be made by initially mixing together the unsaturated organosilicon material and the platinum halide. The resulting mixture is thereafter treated to effect the removal of available inorganic halogen. The platinum-siloxane complex is then recovered from the resulting mixture and further treated to effect the removal of undesirable materials, such as starting reactants, reaction by-products, etc.

Experience has shown that effective results can be achieved in forming the platinum-siloxane complex if there is utilized sufficient unsaturated organosilicon material, with respect to the platinum halide, to provide for at least 3 moles of ≡SiR' units, per gram atom of platinum. In instances where unsaturated siloxane is utilized having the structural unit

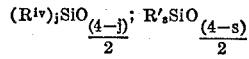

for example a disiloxane, there should be utilized sufficient unsaturated siloxane to provide for at least 3 moles of the structural unit, per 2 gram atoms of platinum. Experience has shown, however, that the proportions of the unsaturated organosilicon material, and the platinum halide can very widely. For economic reasons, however, it has been found desirable to utilize an excess of unsaturated organosilicon material to avoid undue loss of platinum values.

After the platinum halide and the unsaturated organosilicon material have been mixed together, various procedures can be employed to make the platinum-siloxane complex, depending upon the nature of the platinum halide and the unsaturated organosilicon material utilized. For example, in some instances a temperature between −50° C. to 200° C. can be employed, while a preferred temperature is between 0° C. to 100° C.

If the platinum halide is in the form of a platinum-olefin complex, immediate reaction can occur without the employment of external heat. In some instances, external cooling may be necessary.

After the addition has been completed, various procedures can be employed to effect the removal of available inorganic halogen. In order to facilitate the removal of inorganic halogen, it has been found desirable to insure that sufficient water is present in the mixture, which if expressed in number of moles, would be at least equal to the product of the number of gram atoms of platinum times its valence number. Experience has shown, however, that in all instances, unless water is specifically excluded, more than the minimum amount of water is generally present in the mixture, due to atmospheric moisture, or water chemically combined or associated in reactants, solvents, etc., employed during the preparation of the platinum-siloxane complex.

One procedure which has been found effective for removing available inorganic halogen from the reaction mixture is a stripping technique which can combine the employment of heat and reduced pressure, such as pressures of about $10^{-3}$ mm., or above. In some instances, purging with inert gas also can provide for effective results.

Another technique which has been found effective for removing available inorganic halogen, is the employment of a base, which serves to neutralize halogen acid, which can be present in the mixture. Suitable bases are, for example alkali carbonate, such as sodium carbonate, potassium carbonate, sodium bicarbonate, etc., alkali earth carbonates and bicarbonates, alkali hydroxides, such as sodium hydroxide, potassium hydroxide, etc. The employment of base, in the moderate excess of that required to neutralize all available inorganic halogen, to form corresponding salts, provides for effective results. Less than a stoichiometric amount can be employed, but at least that amount must be utilized to provide for the removal of available inorganic halogen so that the average ratio of gram atoms of halogen, per platinum atom, will fall within the scope of the present invention. In addition to stripping, and base treatment, additional methods can be employed to effect the removal of available inorganic halogen from the mixture of the unsaturated organosilicon material and the platinum halide. For example, absorbents such as molecular sieves, can be employed. Suitable commercially available molecular sieves having mesh sizes between 30–120 and at least 4 A. diameter can be utilized.

Another method which can be utilized to effect removal of available inorganic halogen, where platinum halides are employed which are insoluble in organic solvents, for example $K_2PtCl_4$, is the use of certain catalysts, such as $SnCl_2 \cdot H_2O$. The platinum-siloxane complex can be made in an aqueous medium. The recovery of the platinumsiloxane complex can be achieved by employing a non-polar organic solvent, while the excess inorganic halogen will be left in the aqueous medium.

The employment of an organic solvent has been found expedient to facilitate contact between the platinum halide and the unsaturated organosilicon material when initially mixed together. In some instances, a mixture of the organic solvent and water can be employed, while in other situations, the unsaturated organosilicon material itself can serve as a solvent. The nature of the solvent can vary depending upon the type of platinum halide utilized, as well as the nature of the unsaturated organosilicon materials. Generally, however, there can be utilized hydrocarbon solvents, such as aromatic hydrocarbon, alcohols, for example, ethyl alcohol, as well as other low molecular weight aliphatic alcohols, ethers, etc.

Depending upon the method of treatment employed to remove inorganic halogen from the resulting platinum-siloxane complex, various impurities, such as salts, molecular sieves, etc., can be associated with the platinum-siloxane complex. A convenient method for removing undesirable materials is to strip the reaction mixture of solvent, and then extract the platinum-siloxane complex with a suitable solvent, such as a non-polar hydrocarbon solvent, followed by filtration. In instances where the unreacted organosilicon material is sufficiently volatile, it will often be removed during the stripping step.

It has been found in most instances when the platinum-siloxane complex forms, that new infrared absorption frequencies appear at 7.5–7.6 microns and 8.34 microns. In addition, if unsaturated organosilane is utilized, siloxane can be formed by hydrolysis of hydrolyzable radicals or by cleavage of R' radicals from silicon, when $b$ in Formula 1 is 2 or more. Preferably, the aforementioned unit structure should be in the same molecule. However, it has been found that in certain situations valuable results have been achieved where unsaturated siloxane has been employed as a reactant, having only terminal unsaturation.

In instances where a large excess of unsaturated organosilicon material may initially be utilized in making the platinum-siloxane complex which cannot be readily removed by a stripping technique, a mixture of the platinum-siloxane complex and the unsaturated siloxane can be recovered as a platinum-containing organopolysiloxane, as defined within the scope of the invention. Curable organopolysiloxane compositions also can be made by mixing the platinum-siloxane complex with organopolysiloxanes of Formula 6. The mixing of the ingredients can be achieved by milling in instances where the organopolysiloxane is a gum, or by the employment of a solvent where it is a resin. Alternatively, where the organopolysiloxane and platinum-siloxane complex are fluids, mere mixing of the ingredients can suffice.

In order that those skilled in the art will be better able to practice the invention, the following examples are given by way of illustration and not by way of limitation. All parts are by weight.

EXAMPLE 1

There was added 27.8 parts of 1,3-divinyltetramethyl-disiloxane to 19.5 parts of $(PtCl_2 \cdot C_2H_4)_2$. The mixture was then slowly warmed to 30° C. over a period of 1 hour and maintained for an additional hour at 25 to 30° C. with the aid of an ice bath. During this period, ethylene gas was continuously evolved and yellow-red liquid and orange solid remained. Analysis of the product showed that it had a ratio of about 2 gram atoms of chlorine, per gram atom of platinum.

Benzene was added to the above mixture and it was stirred for a period of about 2 hours. There was then added about 48 parts of ethyl alcohol containing about 4½% by weight of water. An exothermic reaction occurred and the reaction mixture was cooled to maintain it at 25 to 30° C. There was obtained a yellow-red solution after the addition was completed. There was then added to the mixture 12.5 parts of sodium bicarbonate resulting in a vigorous evolution of gas. The addition of the sodium dicarbonate was controlled to moderate the rate of gas evolution. After stirring the mixture for an hour at room temperature, it was filtered. The solids were then washed with a mixture of ethanol and benzene. The filtrate was then vacuum stripped of volatiles and a 95% yield of a yellow-red oil was obtained based on starting reactants. Analysis of the product by infrared showed that it was a complex of a 1,3-divinyltetramethyldisiloxane having an out of plane shift of $\equiv CH$ bending from 10.5 microns to 10.7 microns. Analysis for platinum and inorganic chlorine showed a ratio of chlorine atoms, per platinum atoms, having a value not exceeding one.

EXAMPLE 2

The platinum-siloxane complex of Example 1, was added to an organopolysiloxane mixture having a viscosity of about 4,000 centipoises at 25° C. of polydimethylsiloxane having terminal dimethylvinylsiloxy units and a copolymer composed of chemically combined $SiO_2$ units $(CH_3)_3SiO_{0.5}$ units and $(CH_2=CH)CH_3SiO$ units in an amount to provide for a platinum containing organopolysiloxane composition having 2 parts of platinum, per million parts of mixture. Another platinum containing organopolysiloxane composition was made in accordance with the teaching of the present invention, following the same procedure, containing 10 parts of platinum, per million parts of organopolysiloxane.

Other mixtures were prepared following the same procedure with a variety of prior art platinum halides, to produce mixtures two 2 parts of platinum, per million parts of organopolysiloxane, and 10 parts of platinum, per million parts of organopolysiloxane.

There was added to 100 parts of each of the above-described platinum containing organopolysiloxane mixtures, 10 parts of a copolymer of chemically combined $SiO_2$ units and $H(CH_3)_2SiO$ units. The table below shows the results obtained with the various platinum containing organopolysiloxane mixtures containing either the platinum-siloxane complex of the present invention (Karstedt) or other platinum halides. In the table there is shown the time required in minutes to achieve a non-pourable condition, "No Flow Time" with the various platinum containing organopolysiloxane mixtures.

TABLE

| | No flow time | |
|---|---|---|
| P.p.m./Pt | 2 | 10 |
| Karstedt | 210 | 16 |
| 1,5-hexadiene platinum dichloride | 1,770 | 205 |
| $H_2PtCl_6 \cdot CH_2O$ | 2,840 | 568 |
| $(CH=CH_2 \cdot PtCl_2)_2$ | 1,440 | 228 |
| $Na_2PtCl_4 \cdot 4H_2O$ | >2,880 | |

Based on the above results, those skilled in the art would know that the platinum-siloxane catalyst of the present invention (Karstedt) provides for significantly improved cure times with curable organopolysiloxane mixtures. In addition, the above results also show the valuable advantages achieved by utilizing the platinum containing organopolysiloxane compositions of the present invention which can be cured at significantly faster rates at the same parts per million of platinum, as compared to prior art platinum containing organopolysiloxane compositions. The advantages are dramatically shown by the above results where the no flow time utilizing Karstedt catalyst, at 2 parts of platinum per million parts of mixture, is about the same as that achieved with 1,5-hexadiene platinum dichloride, utilized at 10 parts of platinum, per million parts of mixture.

EXAMPLE 3

An amount of sodium bicarbonate was added to a mixture of 25 parts of $Na_2PtCl_4 \cdot 4H_2O$, 50 parts of 1,3-tetramethyldisiloxane and 125 parts of ethyl alcohol, to provide for the production of a mixture having available inorganic chlorine sufficient to provide for an average ratio of chlorine atoms, per platinum atom of a value of about one. Another mixture was prepared following the same procedure free of sodium bicarbonate.

The above mixtures were heated for 5 minutes at a temperature between 70 to 75° C. The solids were washed with ethyl alcohol and were combined with the respective filtrates. Analysis for available inorganic halogen by the modified ASTM designation D-1821-63 for Inorganic Chloride showed that mixture No. 1 heated with sodium bicarbonate had an average ratio of 0.85 gram atom of chlorine, per platinum atom. The untreated mixture No. 2 had an average ratio of 2.2 gram atoms of chlorine, per platinum atom.

In accordance with Example 2, platinum containing organopolysiloxane mixtures were prepared utilizing mixture No. 1 and No. 2 having 10 parts of platinum, per million of mixture. The no flow time obtained with the mixtures were as follows, where Cl/Pt indicates gram atoms of chlorine, per gram atom of platinum.

| Cl/Pt: | No-flow-time/min. |
|---|---|
| 0.85 | 135 |
| 2.2 | 315 |

EXAMPLE 4

There was added 25 parts of sodium bicarbonate to a mixture of 25 parts of sodium chloroplatinite, 50 parts of 1,3-divinyltetramethyldisiloxane and 125 parts of ethyl alcohol. The mixture was then heated for 15 minutes at a temperature between 70 to 75° C. The mixture was then filtered and the solids were washed with ethyl alcohol which was combined with the filtrate. The filtrate was then vacuum stripped of volatiles. The residue was dissolved in 25 parts of benzene, filtered and again vacuum stripped of volatiles. There was obtained 35.6 parts of a red-brown transparent oil.

The oil crystallized at −13° C. Infrared showed the presence of a divinyltetramethyldisiloxane having an out of plane shift of $\equiv$CH bending from 10.5 microns to 10.7 microns. There also was absorbence at 7.5–7.6 microns and 8.34 microns. Elemental analysis for Pt, C, H and Si and its infrared spectrum showed that the complex had three

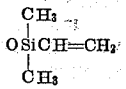

units, chemically combined with each gram atom of platinum.

There was placed under vacuum ($10^{-4}$ mm.), 0.7 part of the above crystalline platinum-siloxane complex. It decomposed at 130° C. There was obtained 0.4 part of organosiloxane of which 90% by weight was 1,3-divinyltetramethyldisiloxane, as identified by its infrared spectrum.

Based upon the above results, those skilled in the art would know that the platinum-siloxane had a ratio of 3 moles of the structural unit

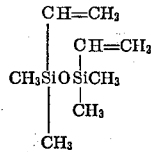

chemically combined with 2 gram atoms of platinum through $\equiv$SiCH=$CH_2$ linkages.

EXAMPLE 5

Two parts of 1,3,5,7-tetramethyl-1,3,5,7-tetravinylcyclotetrasiloxane was added to a mixture of 2 parts of sodium chloroplatinite, 8 parts of ethyl alcohol, and 2 parts of sodium bicarbonate. The resulting mixture was heated at a temperature between 70 to 75° C. for 10 minutes. The mixture was then purged with nitrogen to remove volatiles followed by the addition of 20 parts of benzene. There was obtained a mixture of a yellow liquid and solid. The mixture was filtered. Analysis for platinum and available inorganic chlorine, showed a ratio of 0.8 gram atom of chlorine, per gram atom of platinum. Infrared absorbence also was at 7.5–7.6 and 8.34 microns.

EXAMPLE 6

There was added 5 parts of No. 4A Linde molecular sieve to a mixture of 0.7 part of $H_2PtCl_6 \cdot H_2O$, 5.0 parts of ethanol and 2 parts of 1,3-divinyltetramethyldisiloxane. The mixture was agitated for a period of 72 hours. There was obtained a mixture having an orange to yellow color with precipitate. Following the addition of 5 parts of benzene to the mixture, it was filtered. The sieve and the precipitate were then washed twice with two additional parts of benzene. The filtrate was then stripped of volatiles by using a nitrogen purge. As the last traces of volatiles were being removed, a light tan colored precipitate separated from the mixture. The product was then washed with additional benzene and filtered. It was then purged with additional nitrogen to remove the last traces of volatiles. There was obtained 2 parts of a red-brown transparent liquid. Analysis for available inorganic chlorine shows that the product has an average ratio of less than about 1 gram atom of chlorine, per gram atom of platinum.

It is evaluated as a hydrosilation catalyst in accordance with the procedure of Example 2. It is found that a platinum containing organopolysiloxane mixture having 10 p.p.m. of platinum, shows a considerable reduced no flow time, as compared with the prior art platinum halides.

EXAMPLE 7

There was added 20 parts of sodium bicarbonate to a mixture of 10 parts of $H_2PtCl_6 \cdot 6H_2O$, 20 parts of 1,3-divinyltetramethyldisiloxane and 50 parts of ethyl alcohol. The mixture was agitated while being refluxed for a period of 30 minutes, and left undisturbed for 15 hours. The mixture was filtered, stripped of volatiles under vacuum. There was obtained 17 parts of a liquid product. It was dissolved in benzene and filtered. The product was a platinum-siloxane complex substantially free of available inorganic chlorine, based on inorganic chloride analysis.

The above platinum-siloxane complex in benzene was incorporated into the dimethylvinylsiloxy terminated polydimethylsiloxane of Example 2, to produce a platinum containing organopolysiloxane having 10 parts of platinum, per million of mixture. A no flow time was achieved in less than a minute. Similar mixtures containing prior art platinum (II) chlorides, remained fluid after several hours.

EXAMPLE 8

There was added 2 parts of sodium bicarbonate to a mixture of 2 parts of $Na_2PtCl_4 \cdot 4H_2O$, 2 parts of dimethyldivinylsilane, and 8 parts of ethyl alcohol. When the mixture was stirred, exothermic heat was produced along with gaseous evolution. The mixture was then heated gently for about 1 minute and then left undisturbed for 10 minutes. Volatiles were then purged from the mixture with nitrogen. There was then added 20 parts of benzene to the mixture and the mixture was filtered and the filtrate was stripped of organic solvent with nitrogen. A liquid was obtained which was mixed with a solvent mixture of equal parts by weight of benzene and ethyl alcohol. Analysis of the mixture for available inorganic chlorine and platinum showed a platinum ratio of about 0.2 gram atoms of chlorine, per gram atom of platinum. In addition, its infrared spectrum showed the presence of siloxane and was identical to the infrared spectrum of the platinum-siloxane complex prepared in Example 4.

The above procedure was repeated except that there was utilized 6 parts of diphenyldivinylsilane in place of the dimethyldivinylsilane. Analysis of the resulting product showed an average ratio of 0.67 gram atoms of chlorine, per platinum atom. The infrared spectrum of the product also showed the presence of disiloxane and absorption bands due to the presence of phenyl radicals attached to silicon.

The above-described platinum siloxane complexes showing tetramethyldisiloxane and tetraphenydisiloxane absorption are utilized as hydrosilation catalysts in a procedure similar to that shown in Example 2. It is found that the no flow state is achieved in considerably less time than that achieved with platinum halides having an average ratio of at least 2 gram atoms of chlorine, per platinum atom.

EXAMPLE 9

There was added 5 parts of 1.5 normal hydrochloric acid to a mixture of 1 part of $K_2PtCl_4$, 0.1 part of $K_2PtCl_2$, 0.1 part of $SnCl_2.2H_2O$ and 2 parts of 1,3-divinyltetramethyldisiloxane. The mixture was shaken for 4 hours under atmospheric conditions. The silicone layer acquired a red color. To the two-phase mixture, there was added about 4 parts of benzene and the mixture was further agitated. The benzene layer was then recovered and dried. Analysis of the benzene layer showed the presence of a platinum-siloxane complex having a ratio of less than one gram atom of chlorine, per gram atom of platinum. An infrared spectrum of the solution showed the characteristic spectrum of the platinum siloxane complex of Example 4.

EXAMPLE 10

Following the teaching of Bruner Pat. 3,105,061, an organopolysiloxane polymer is made by quickly adding about one mole of 1,3-diacetoxy, 1,3-divinyl, 1,3-dimethyldisiloxane to a mole of sym-tetramethyldisiloxane, 1,3-diol. The mixture is allowed to stand under atmospheric conditions for about 24 hours, and then stripped. Based on method of preparation there is obtained a polymer having about 500 chemically combined siloxy units, including units of the formula,

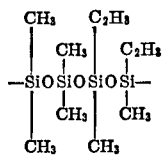

There is added two parts of sodium bicarbonate to a mixture of 4 parts of the above organosiloxane, 2 parts of $Na_2PtCl_4.H_2O$ and 8 parts of ethyl alcohol, and 8 parts of benzene. The mixture is allowed to stand under atmospheric conditions for about 1 week. It is then vacuum stripped and mixed with benzene and then filtered. There is obtained a platinum-siloxane complex having an average ratio of less than one gram atom of chlorine, per platinum atom.

EXAMPLE 11

There was added 6 parts of 1,3-divinyltetramethyldisiloxane to a mixture of 3 parts of $Na_2PtCl_4.4H_2O$ and 9 parts of ethanol. The mixture was heated with stirring over 5 minutes, and then refluxed for 10 minutes at a temperature between 70 to 75° C. The mixture was then filtered and the solids washed with ethanol. There was obtained 0.8 part of a water soluble solid.

After the filtrate had been subjected to a reduced pressure of 20 millimeters for 4 hours, it was then dissolved in a mixture of 10 parts of benzene and 2 parts of additional 1,3-divinyltetramethyldisiloxane. Further stripping of the mixture resulted in the separation of a yellow liquid. The liquid was heated in the presence of air saturated with water vapor, at 50° C. for 20 minutes. It was vacuum stripped at 20 millimeters at 25° C. It was then purged with nitrogen for a period of about 10 hours. There was obtained 4 parts of a brown liquid. Analysis of the liquid showed that there was a ratio of less than 0.5 gram atom of chlorine per gram atom of platinum.

The above product is employed as a hydrosilation catalyst as shown in Example 2. It is found that no flow times of organopolysiloxane mixture having 10 parts of platinum, per million of mixture, are substantially equivalent to the platinum-siloxane complex having an average ratio of gram atoms of chlorine, per gram atom of platinum having a value not exceeding one.

EXAMPLE 12

A platinum-siloxane complex of Example 1, is milled with a polyorganosiloxane having a viscosity of about 5 million centipoises at 25° C. composed of chemically combined dimethylsiloxy units, methylcyanoethylsiloxy units, methylvinylsiloxy units and chain-stopped with dimethylvinylsiloxy units. There is about 0.2 mole percent of methylvinylsiloxy units in the polymer, based on the total of chemically combined siloxy units. The amount of platinum-siloxane complex employed, is sufficient to provide for an organopolysiloxane composition having about one part of platinum, per million parts composition. There is milled with 100 parts of this platinum containing organopolysiloxane composition, 0.15 part of tetramethylcyclotetrasiloxane. The resulting composition is then quickly transferred to a mold and heated in a press for ten minutes at 300° F. There is obtained a cured elastomer having valuable properties.

While the foregoing examples have of necessity been limited to only a few of the very many variables within the scope of the present invention, it should be understood that the present invention is directed to a much broader class of platinum-siloxane complexes, which can consist essentially of chemically combined platinum and organo-siloxanes of Formula 3, for example

where R, R', R'', $h$, $f$ and $e$ are as defined above, the sum of $h$, $f$ and $e$ per silicon atom is equal to 3, and has available inorganic halogen which is not sufficient to provide for an average ratio of gram atoms of halogen, per gram atom of platinum having a value greater than one. In addition, the present invention is also directed to a much broader class of platinum containing organopolysiloxane compositions comprising the aforementioned platinum-siloxane complexes and organopolysiloxanes of Formula 6.

Further, the present invention is broadly directed to a method for making the above-described platinum-siloxane complexes, which can be made by contacting unsaturated organosilicon material of Formula 1 and 2 with a platinum halide and treating the resulting product in accordance with the practice of the invention.

What I claim is:

1. A method which comprises (1) effecting contact between (A) an unsaturated organosilicon material and (B) a platinum halide, to provide for the production of a mixture having a concentration of available inorganic halogen which is sufficient to provide for an average ratio of gram atoms of halogen, per gram atom of platinum having a value of at least 2, (2) treating the resulting mixture of (1) with a base to effect the removal of inorganic halogen, and (3) recovering from (2) a platinum-siloxane complex having infrared absorption bands at about 7.5 to 7.6 and about 8.3 microns and having available inorganic halogen which is sufficient to provide for an average ratio of gram atoms of halogen, per gram atom of platinum having a value of up to one, where A is a member selected from the class consisting of unsaturated silanes of the formula,

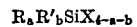

and unsaturated siloxanes of the formula,

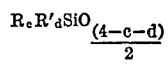

R is free of aliphatic unsaturation and is a member selected from the class consisting of monovalent hydrocarbon radicals and halogenated monovalent hydrocarbon radicals, R' is a member selected from the class consisting of monovalent aliphatically unsaturated hydrocarbon radicals and halogenated monovalent aliphatically unsaturated hydrocarbon radicals, X is a hydrolyzable radical, $a$ is a whole number equal to 0 to 2, inclusive, $b$ is an integer equal to 1 to 4, inclusive, and the sum of $a$ and $b$ is equal to 1 to 4, inclusive, $c$ has a value equal to 0 to 2, inclusive, $d$ has a value equal to 0.0002 to 3, inclusive, and the sum of $c$ and $d$ is equal to 1 to 3, inclusive.

2. A method in accordance with claim 1, where the unsaturated siloxane has at least one structural unit of the formula,

where R is a member selected from the class consisting of monovalent aliphatically unsaturated hydrocarbon radicals and halogenated monovalent aliphatically unsaturated hydrocarbon radicals.

3. A method in accordance with claim 1, where the platinum halide is an alkali haloplatinite.

4. A method in accordance with claim 1, where treatment of the mixture is achieved with an alkali salt of carbonic acid.

5. A method in accordance with claim 1, which comprises (1) effecting contact between sodium chloroplatinite and 1,2-divinyltetramethyldisiloxane, to provide for a mixture having available inorganic halogen which is sufficient to provide for an average ratio of at least two gram atoms of chlorine, per gram atom of platinum, (2) treating the mixture of (1) with sodium bicarbonate to neutralize available inorganic chlorine, and (3) recovering a complex of platinum and 1,3-divinyltetramethyldisiloxane having a shift from 10.5 to 10.7 microns in the out of-plane bending vibration characteristics of the $\equiv$Si—CH=CH$_2$ group in the infrared absorption band.

6. A platinum-siloxane complex consisting essentially of chemically combined platinum and an organosiloxane of the average unit formula,

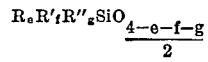

where R is free of aliphatic unsaturation and is selected from the group consisting of alkyl radicals, cycloalkyl radicals, and phenyl radicals, R' is selected from the group consisting of aliphatically unsaturated olefinic and acetylinic radicals; R" is selected from R' radicals chemically combined with platinum having an infrared absorption band at 7.5 to 7.6 and 8.3 microns in the spectrum of the platinum-siloxane complex, in which the available inorganic halogen which can be detected does not exceed that quantity which is sufficient to provide for an average ratio of gram atoms of halogen per gram atoms of platinum having a value greater than one and there is present at least 3 moles of R" units per gram atom of platinum, $e$ has a value equal to 0 to 2, inclusive, $f$ has a value equal to 0 to 2, inclusive, $g$ has a value equal to 0.0002 to 3, inclusive and the sum of $e$, $f$ and $g$ has a value equal to 1 to 3.

7. A complex in accordance with claim 6 of 1,3-divinyltetramethyldisiloxane with platinum.

References Cited
UNITED STATES PATENTS

| | | | |
|---|---|---|---|
| 3,159,601 | 12/1964 | Ashby | 260—46.5 |
| 3,197,432 | 7/1965 | Lamoreaux | 260—46.5 |
| 3,419,593 | 12/1968 | Willing | 260—448.2 |

DANIEL E. WYMAN, Primary Examiner

A. P. DEMERS, Assistant Examiner

U.S. Cl. X.R.

252—429 R, 431 R; 46.5 F, 46.5 UA, 448.2 E